US007221935B2

(12) United States Patent
Barriga-Caceres et al.

(10) Patent No.: US 7,221,935 B2
(45) Date of Patent: May 22, 2007

(54) SYSTEM, METHOD AND APPARATUS FOR FEDERATED SINGLE SIGN-ON SERVICES

(75) Inventors: Luis Barriga-Caceres, Madrid (ES); Jesus Angel de Gregorio-Rodriguez, Madrid (ES); Avelina Pardo-Blazquez, Madrid (ES); John Michael Walker-Pina, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 855 days.

(21) Appl. No.: 10/176,471

(22) Filed: Jun. 19, 2002

(65) Prior Publication Data

US 2003/0163733 A1 Aug. 28, 2003

Related U.S. Application Data

(60) Provisional application No. 60/361,382, filed on Feb. 28, 2002, provisional application No. 60/377,059, filed on May 1, 2002.

(51) Int. Cl.
*H04M 3/42* (2006.01)
*H04Q 7/22* (2006.01)
*H04Q 7/38* (2006.01)

(52) U.S. Cl. .............. 455/414.1; 455/411; 455/432.1

(58) Field of Classification Search ............ 455/411, 455/463, 406.1, 410, 432.1, 432.3, 433, 414.1, 455/408
See application file for complete search history.

(56) References Cited

U.S. PATENT DOCUMENTS 5,978,687 A * 11/1999 Maenpaa .................. 455/555

(Continued)

FOREIGN PATENT DOCUMENTS

EP 1 089 516 4/2001

(Continued)

OTHER PUBLICATIONS

"Oasis Security Services Use Cases and Requirements" Paper; Oasis Security Services TC; May 30, 2001; 29 pages.

(Continued)

*Primary Examiner*—Joseph Feild
*Assistant Examiner*—Jaime Holliday
(74) *Attorney, Agent, or Firm*—Michael Cameron, Esq.

(57) ABSTRACT

The advent of new and sophisticated web services provided by Service Providers to users, services that individually require authentication of user and authorization of access, brings the needs for a new service to facilitate such authentication and access, a service referred to as Single Sign-On (SSO). The basic principle behind SSO is that users are authenticated once at a particular level, and then access all their subscribed services accepting that level of authentication.

The present invention provides a system, method and apparatus wherein a cellular Federation of mobile network operators becomes an SSO authentication authority for subscribers of this Federation accessing Service Providers having such agreement with a mobile network operator of the Federation. In accordance with this invention, mobile network operators can leverage their operator-subscriber trust relationship in order to act as SSO authentication authority for those subscribers accessing Service Providers in a service domain other than the mobile network domain.

24 Claims, 12 Drawing Sheets

U.S. PATENT DOCUMENTS

| | | |
|---|---|---|
| 6,430,276 B1 | 8/2002 | Bouvier et al. |
| 6,728,536 B1 * | 4/2004 | Basilier et al. .......... 455/432.1 |
| 2002/0133412 A1 * | 9/2002 | Oliver et al. ................ 705/26 |

FOREIGN PATENT DOCUMENTS

| | | |
|---|---|---|
| EP | 1 221 818 A1 | 7/2002 |
| EP | 1 259 084 A1 | 11/2002 |
| WO | WO 01/11450 | 2/2001 |
| WO | WO 01/60013 | 8/2001 |
| WO | WO 01/72009 A2 | 9/2001 |

OTHER PUBLICATIONS

RD-429128: Servlet/Applet/HTML authentication Process with single sign-on employs authentication data encrypted single sign-on cookie to provide secure Servlets; Ericsson EPS; Jan. 10, 2000; pp. 1-4.

* cited by examiner

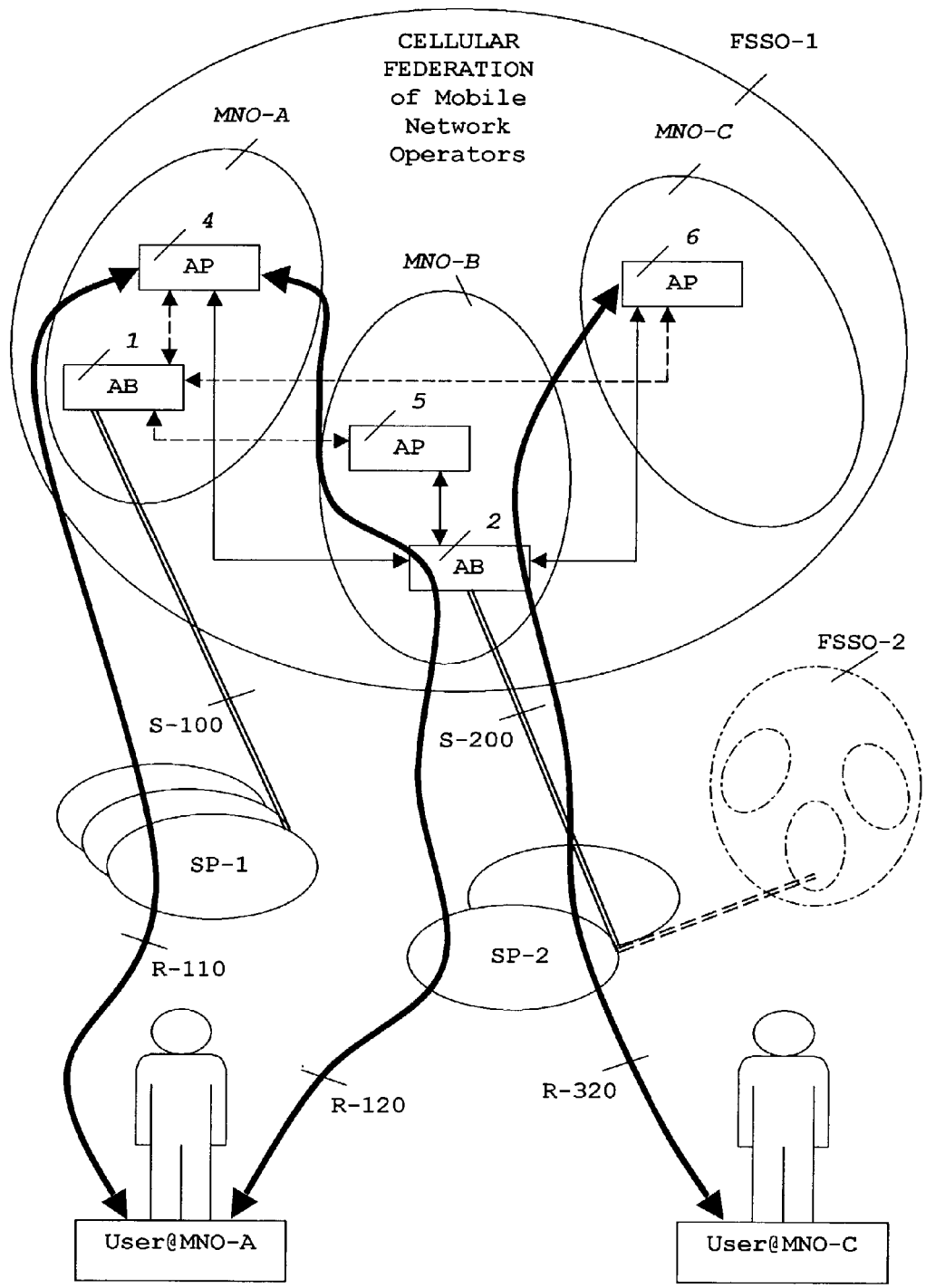
FIG.-1-

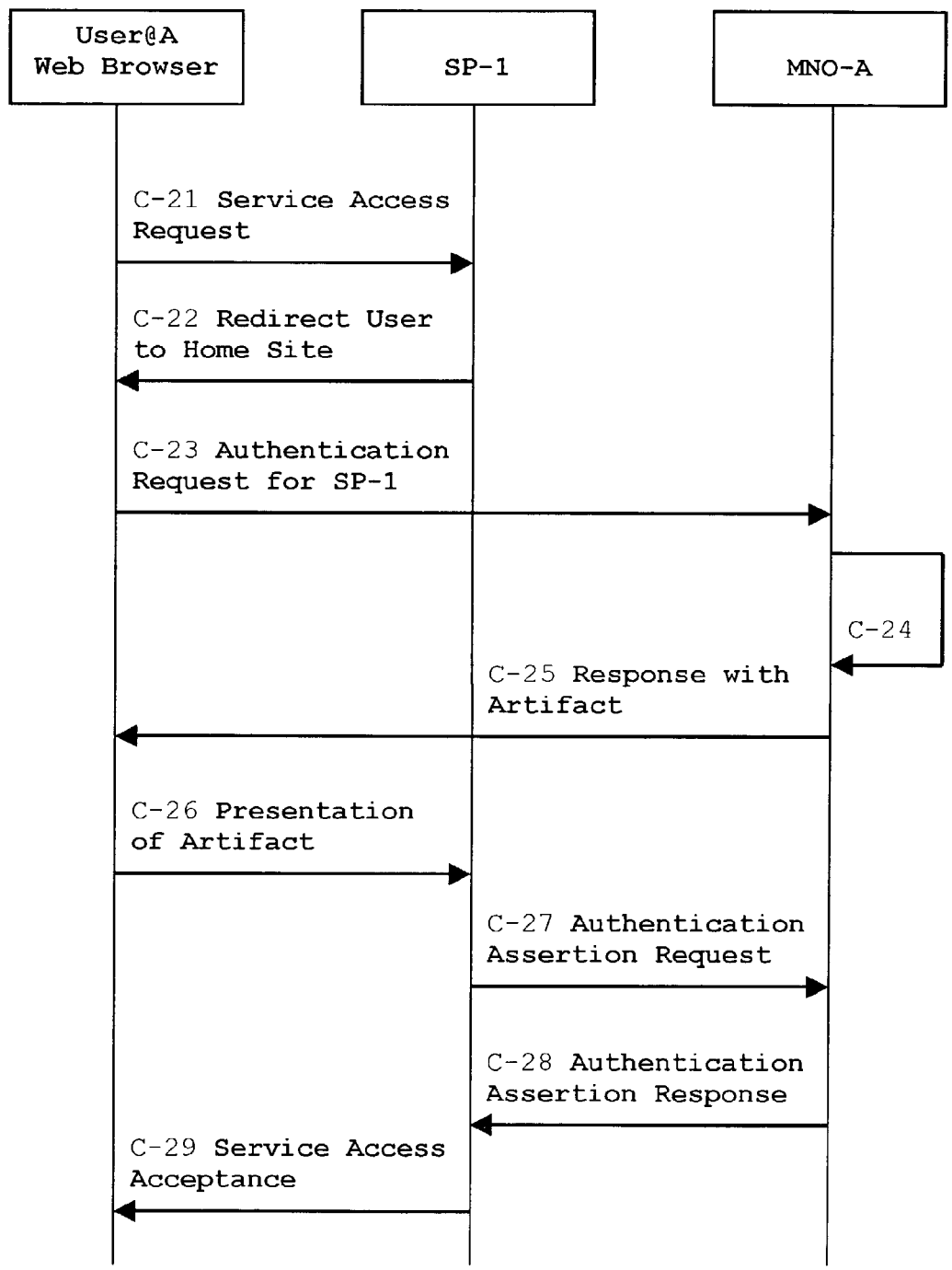
FIG.-2-

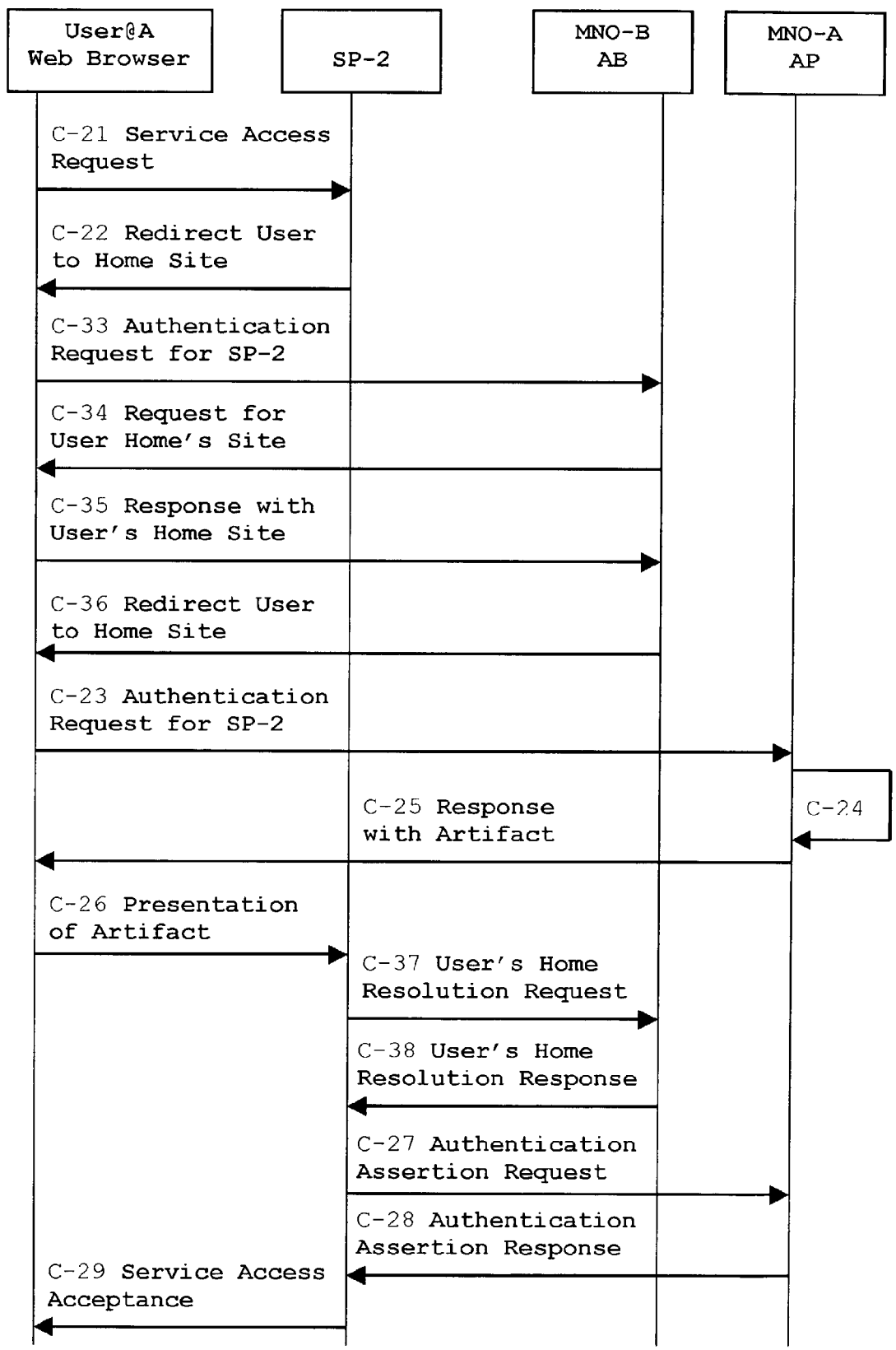
FIG.-3-

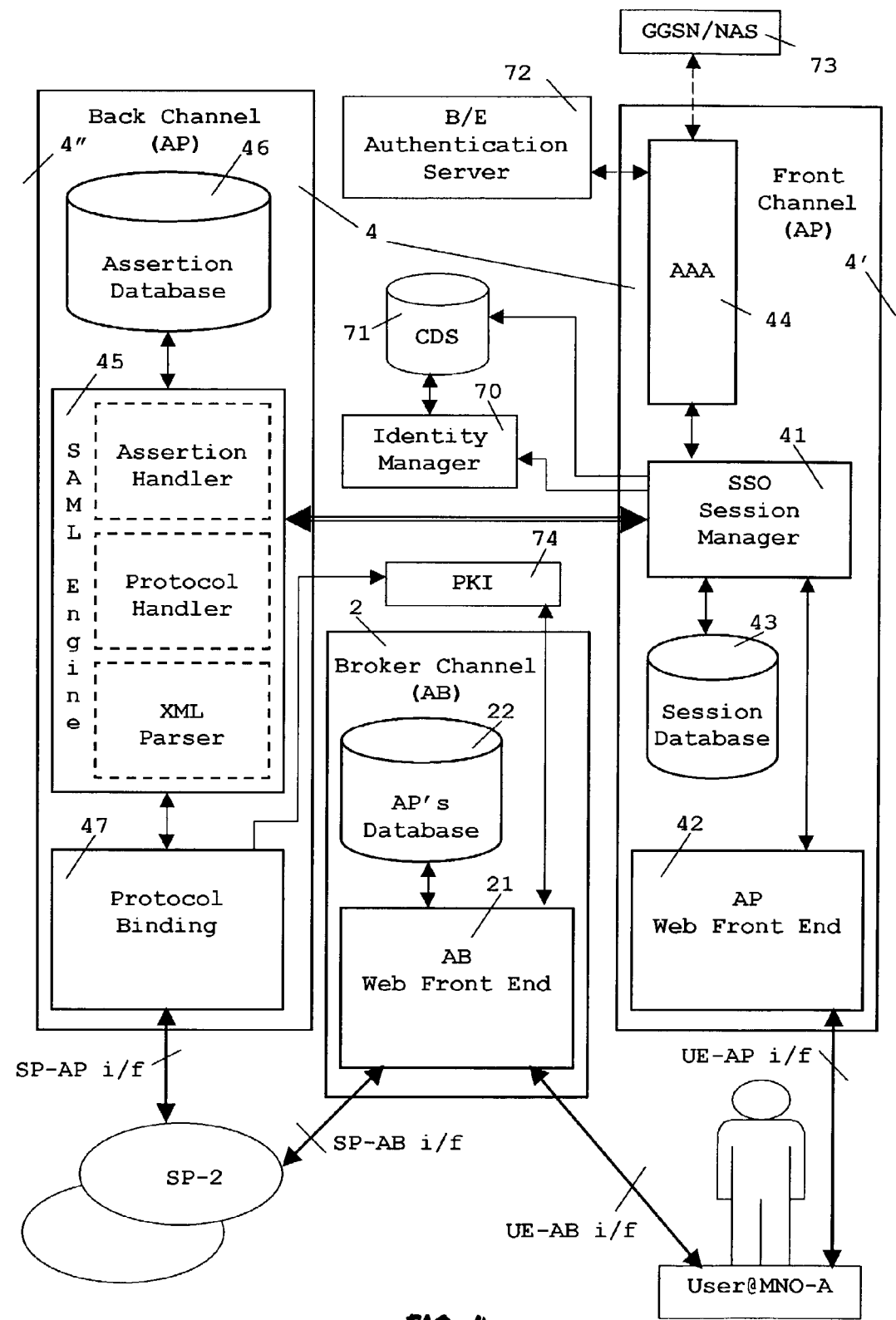
FIG.-4-

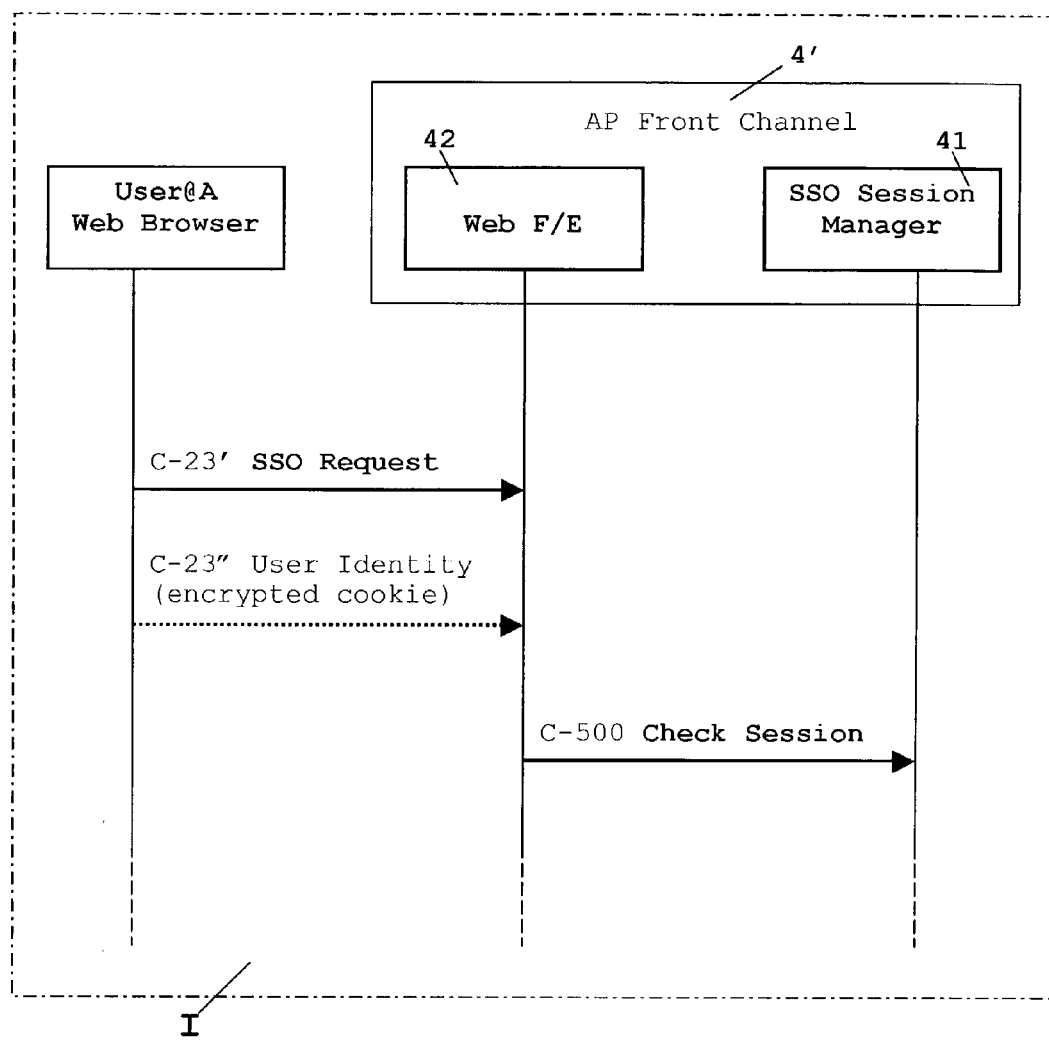
FIG.-5A-

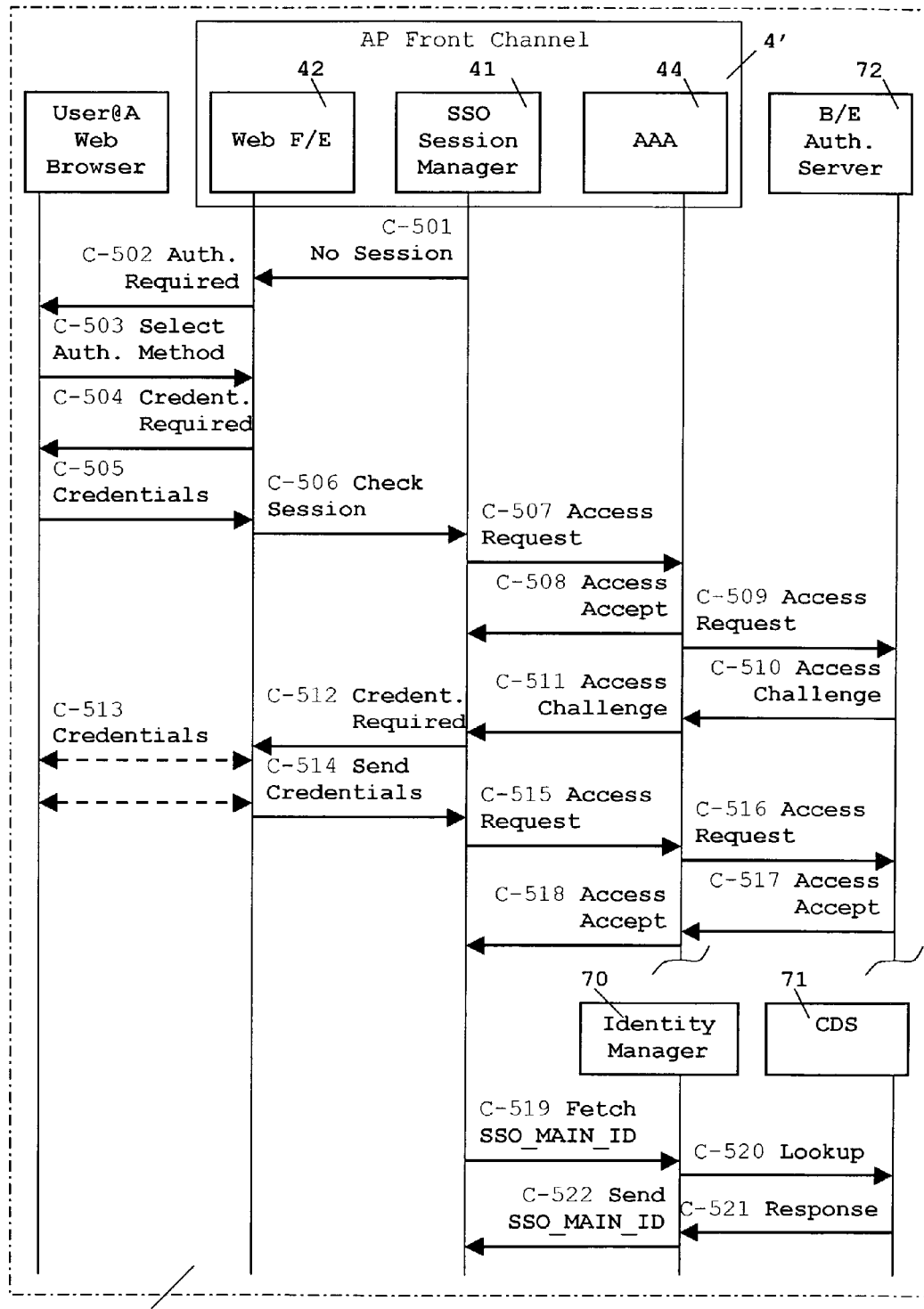
FIG.-5B-

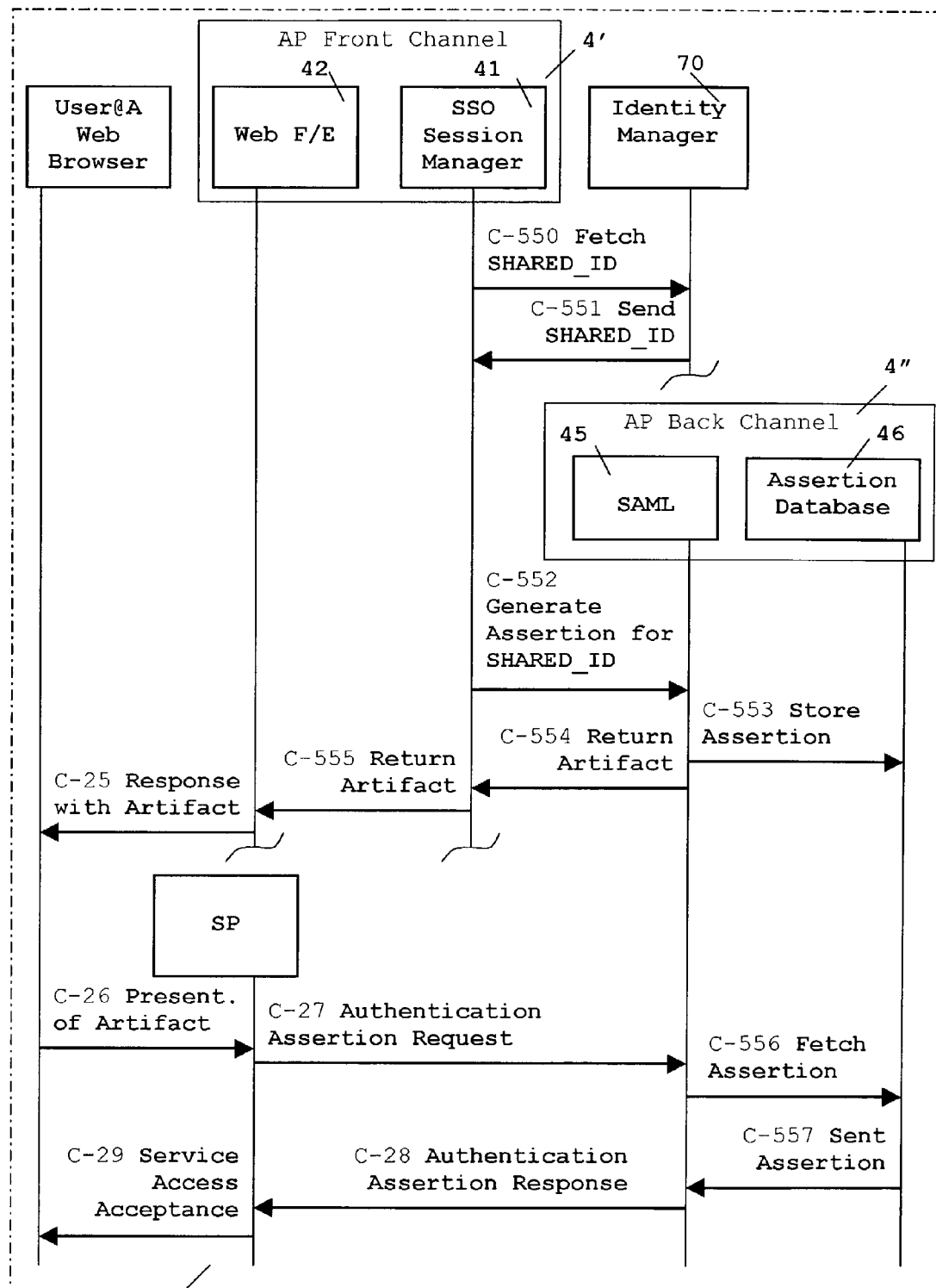
FIG.-5C-

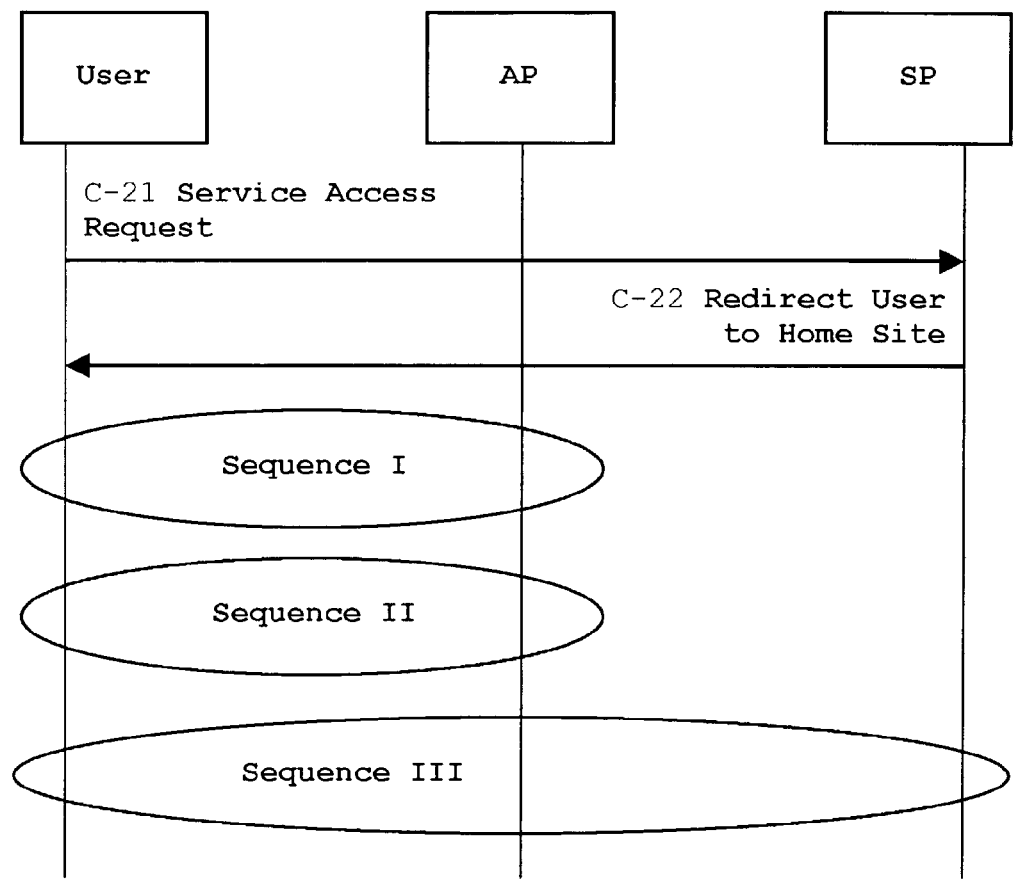
FIG.-6-

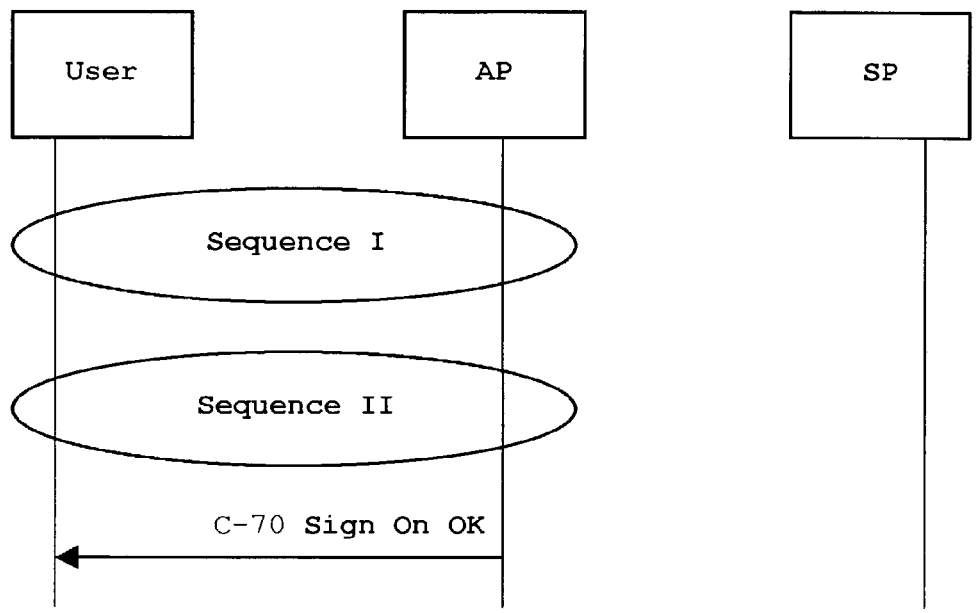
FIG.-7A-
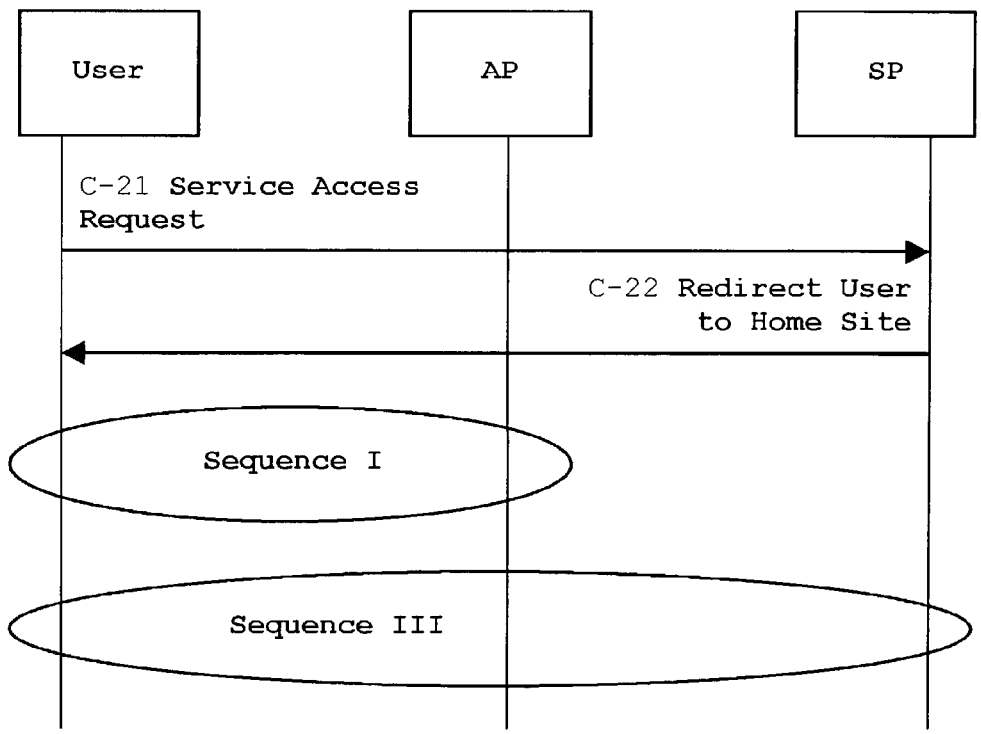
FIG.-7B-

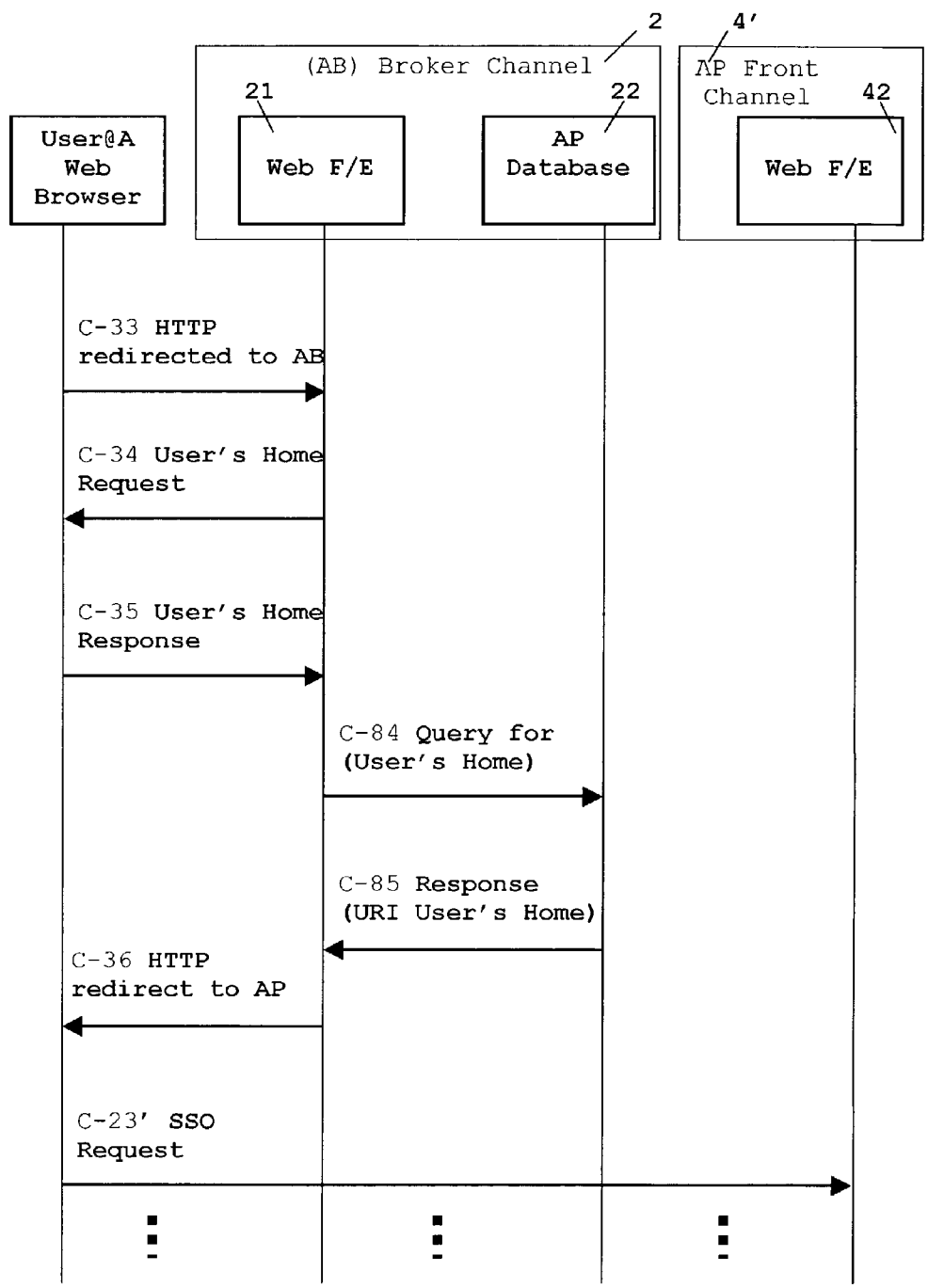
FIG.-8-

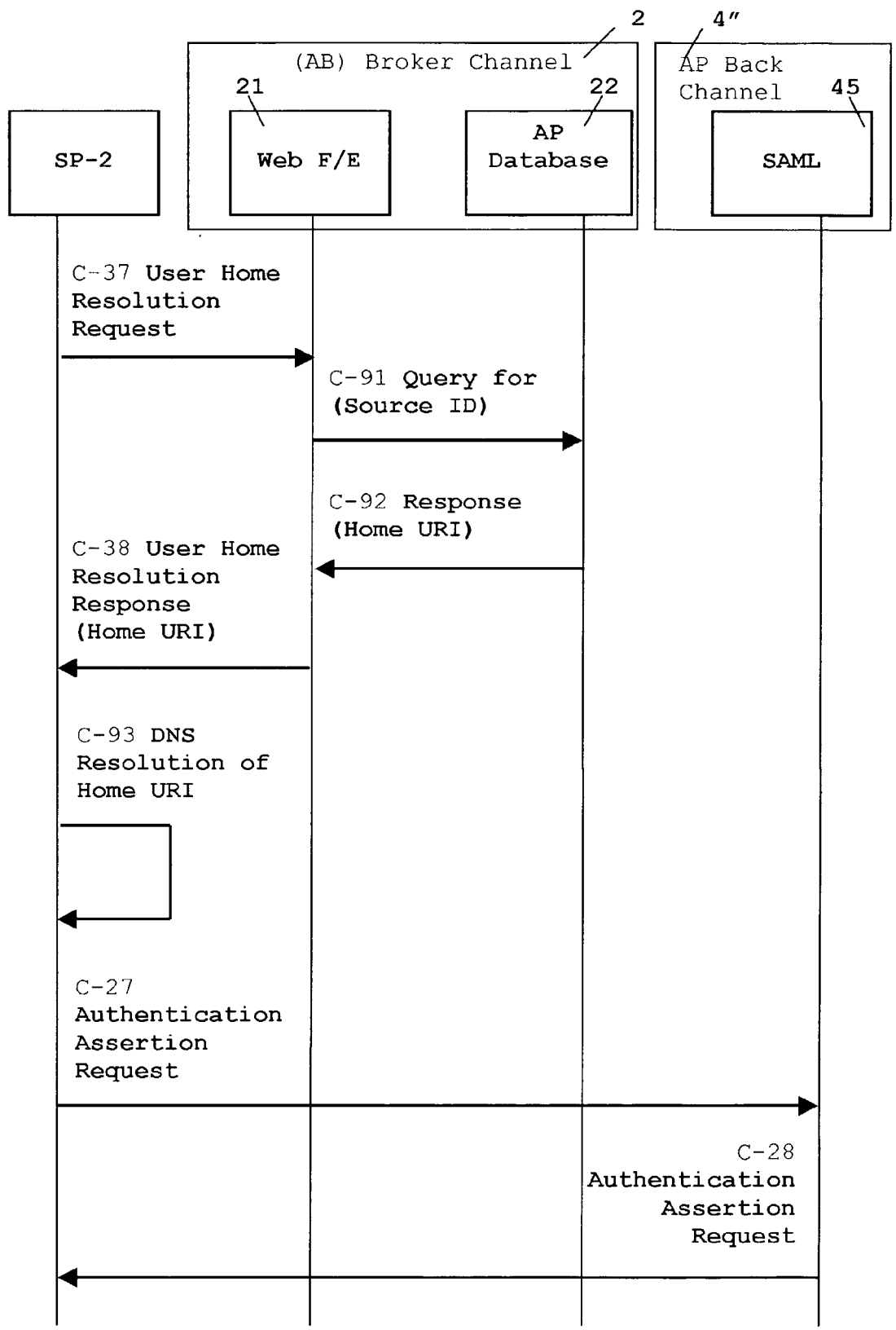
FIG.-9-

*SSO_MAIN_ID*

| MAIN IDENTITY |
| --- |
| User@mno.com |

*SSO_auth_ID*

| MSISDN | IMSI | NAI#1 | NAI#2 |
| --- | --- | --- | --- |
| 34782032 | 347089673 | User1@mno | User2@mno |

*SHARED_ID*

| Service Provider | SHARED_ID | Property |
| --- | --- | --- |
| Books.com | x78kvf | |
| Travel.net | User@travel.net | |
| Games.com | User1@mno | |
| xxx.org | | CONCEAL |

FIG.-10-

SYSTEM, METHOD AND APPARATUS FOR FEDERATED SINGLE SIGN-ON SERVICES

CROSS REFERENCE TO RELATED APPLICATIONS

This application for patent claims the benefit of priority from, and hereby incorporates by reference the entire disclosure of U.S. provisional application for patent Ser. No. 60/361,382, filed Feb. 28, 2002, and U.S. provisional application for patent Ser. No. 60/377,059, filed May 1, 2002.

FIELD OF THE INVENTION

The present invention generally relates to Single Sign-On services that can be offered for a plurality of users. More particularly, the invention pertains to means, system and methods for offering Single Sign-On web-based services for a plurality of users that are subscribers of Mobile Network Operator networks.

BACKGROUND OF THE INVENTION

The advent of web services has brought with them a new service that allows users to access said web services in an easy and convenient manner, the so-called Single Sign-On (SSO). The current SSO principle states that users shall be able to authenticate once and shall be given access to all their subscribed services that accept such level of authentication. This principle focuses on end-user convenience while leaving open the capabilities of terminals and networks when implementing the SSO. Thus, the current trends address two approaches for carrying out the SSO principle.

In a first approach, namely a "terminal-centric" approach, the user authenticates once to the terminal that in turn automatically tracks a service-oriented network access and transparently presents, that is, without further user involvement, the appropriate credentials to the service-oriented network that requests such credentials.

In a second approach, namely a "network-centric" approach, the user authenticates once to an Authentication Provider (AP) in a network that in turn handles the appropriate credentials for the services.

The so-called "network-centric" approach is suitable when domain trust relationships exist among authentication providers and service providers, whereas the terminal-centric approach is useful when such relationships do not exist and the terminal can track the authentication towards disparate domains or services.

It is also possible to combine both approaches. A network operator may issue credentials such as digital certificates, short-time certificates, or temporary tickets or tokens that may be stored in the terminal or in an accessible read/write card. These are further used by the user upon authentication or authorization procedures.

Conventional cellular operators use authentication services to grant subscribers accesses to voice and data services provided by such operators. As cellular operators move up in the value chain, they could leverage their mutual trust relationship with their own subscribers in order to play a new role of Authentication Providers for their respective subscriber population in emerging business models in which service domain and authentication services belong to different administrative entities. In this respect, an operator that is able to provide both accesses, namely IP connectivity and services, might additionally offer to its subscribers an "access authentication SSO" so that an authentication performed at the access level might be valid as authentication in a service domain. This is a relevant starting point for further disclosing the objects of the present invention.

More precisely, the relationship between a service domain and an authentication provider, as well as the services that a user may be offered, must be taken into account for discussing advantages and disadvantages of the above approaches. Generally speaking, an Authentication Provider may belong to the same administrative domain as the Service Provider offering the service, or may be delegated to an external trusted party or to a distributed federation.

A primary object of the present invention is the support of Single Sign-On (SSO) services for subscribers of a Federation of Mobile Network Operators (MNO), subscribers who are users of different Service Providers (SP). Said SSO services are supported in such a manner that users, Federation of Mobile Network Operators, and Service Providers holding agreements with at least one member of such Federation, all get additional advantages and value added services from a given architectural and business reference model in accordance with this invention.

More specifically, the users have the advantage of the SSO service for accessing any service at any Service Provider (SP) within the reference model agreement. The Mobile Network Operators (MNO) may obtain revenues by offering SSO services, in particular authentication and authorization, to third parties as well as keeping subscribers loyalty by adding value to their respective mobile subscriptions. Eventually, the Service Providers may experience an increase of potential users, namely mobile subscribers, with a simpler and much safer authentication and authorization mechanisms minimizing the support for different such mechanisms depending on the different nature of users. In this scenario Authentication Provider and Service Provider belong to different administrative domains. At the same time, these distributed advantages favor an increase of a so-called mobile commerce (m-commerce), which can be regarded as a further object of the present invention.

DESCRIPTION OF RELATED ART

The "network-centric" approach, as above described, seems to be more suitable for scenarios involving users of Service Providers who are also subscribers of Mobile Network Operators, the latter wanting to play the role of Authentication Providers. However, the closest known prior art is herein discussed with reference to SSO services in a generic network-centric approach independently of the type of the network acting as Authentication Provider.

For instance, U.S. Patent Application Publication US 2002/0010776 A1 to Lerner describes methods and systems for providing a Single Sign-On (SSO) distributed application services integration for authentication and authorization services. The relevant teaching in this application starts when a first indication from a user, who is pointing a browser of a first application, is received at a central server coupled to the user terminal. Then, a cookie file corresponding to the user is also received at the central server from the browser of the first application. The central server, then, updates the cookie file received from the browser.

A cookie file is a data segment of variable length and typically including hundreds of bytes. These cookies are written, read and modified by an application interface library resident in each affiliated web server, whether local to the central server or residing in a remote partner's site. More specifically, the updating of a received cookie file includes the comparison of the cookie file with some predetermined parameters and the eventual modification of the cookie file based on this comparison.

When a second indication from the user is received at the central server indicating that the user is pointing the server to a second application, the central server provides this updated cookie file to the second application.

This patent application states that the above application interface library, which is responsible for writing, reading and modifying the cookie files, is configured for also authenticating users among other applications. Consequently, one of ordinary skill in the art would readily recognize that authentication data and corresponding functions for all the users reside in each affiliated web server, at local or remote partner's sites, what is an additional disadvantage for administration. Specifically, particular actions are taken at any application in an affiliated web server, which browser is pointed by the user, with regard to the authentication of such user even though the user has got the benefit of an SSO service. Thus, one may see this mechanism as an example of a scenario wherein Authentication Provider and Service Provider belong to the same administrative domain.

The above teaching does not seem to be applicable for large telecommunication systems comprising a Federation of Mobile Network Operators, a plurality of different Service Providers that have likely signed agreements with at least one member of the Federation, and a huge amount of potential users who are mobile subscribers of any member of the Federation.

Moreover, given that the subscriber authentication data and algorithms are quite sensitive information, the MNO are very reluctant to spread this information through entities outside their own premises.

Another significant instance of methods and system for Single Sign-On user access is described in the European patent application EP-1089516 to Grandcolas et al. wherein users may gain access to multiple web servers.

This application describes how a user is authenticated at a first web server that allows the user to select a second web server offering a desirable service. When the user effectively selects the second web server, the first web server constructs an encrypted authentication token, and transmits it to the second web server. The second web server authenticates the received token and allows the user to have a session at this second web server. Both first and second web server share, in accordance with this application, a sub-domain. That is, the scenario in this application is an instance where the Authentication Provider, namely the first web server, and the Service Provider, namely the second web server, both belong to the same administrative domain.

Thereby, the teaching in this application cannot be applied to scenarios where Authentication Provider and Service Provider belong to different administrative domains. That is, the first web server in this application, the Authentication Provider, is the first contact for the user accessing the second web server where the service is offered.

Consequently, this approach does not seem to be convenient for commercial use in scenarios where the Authentication Provider and Service Provider belong to different administrative domains. In such scenarios a user directly accesses a Service Provider that requests an Authentication Authority to authenticate the user and, once such authentication has been successfully carried out, the Authentication Authority authorizes the Service Provider to offer the selected service for that user.

A known solution nowadays, representative of a scenario where Authentication Provider and Service Provider belong to different administrative and commercial domains is the Microsoft® NET Passport product (as described in http://www.passport.com and hereinafter simply referred to as ".NET Passport"). This product is intended to build up a broader Internet trust network with a common set of technical and operational guidelines open to any organization supporting the corresponding standards.

However, this approach does not solve the problem of building up a Federation of Mobile Network Operators to be responsible for the Authentication of its own mobile subscribers accessing Service Providers that are associated to at least one member of such Federation. Moreover, an approach like the NET Passport, which is intended to become a very large Internet authentication system, is a close solution based on a centralized authentication authority not offering any advantageous deal to the Mobile Network Operators and subscribers.

Thereby, an important object of the present invention is the provision of a system, means and methods for building up a Federation of Mobile Network Operators (MNO) acting as an authentication authority towards associated Service Providers (SP) offering Single Sign-On (SSO) services to the subscribers of any MNO in the Federation. It is another object of the present invention that the Federation acting as an authentication authority thus accomplishes security and privacy related requirements at a same or higher level than those currently used by Mobile Network Operators. It is a further object of the present invention to establish an architectural and business reference model in regard to actors, roles, relationships and basic use cases in conformity with the system, means and methods of the above objects.

SUMMARY OF THE INVENTION

The above objects, among other things, are accomplished in accordance with the invention by the provision of a system, method and apparatus for providing Single Sign-On services to a user accessing selected Service Providers, the user having subscription with a first mobile network operator.

The telecommunication system comprising a first mobile network that belongs to a first mobile network operator, at least one second mobile network that belongs to a second mobile network operator, and at least one of a plurality of Service Providers for providing services to subscribers of said mobile network operators once the subscribers have been authenticated for the at least one Service Provider by an authentication authority.

In accordance with an aspect of the present invention, the first mobile network operator and the at least one second mobile network operator both conform or belong to a cellular Federation of mobile network operators that acts as the authentication authority.

Moreover, the system comprises an Authentication Provider belonging to the first mobile network as the only member of the Federation entitled to authenticate the user toward the at least one Service Provider; and an Authentication Broker belonging to a second mobile network and arranged to act as the entry point to the Federation from those Service Providers having an agreement with the second mobile network operator for such purpose. Herein, an agreement of this type is referred to as an "entry point" agreement.

That is, the telecommunication system comprises means for redirecting a user accessing a Service Provider, the user having a subscription with a first mobile network operator, toward an Authentication Broker of a second mobile network operator having such agreement with the Service Provider, and means for redirecting the user accessing the Authentication Broker toward an Authentication Provider of the user's Home first mobile network operator. In addition, the telecommunication system comprises means for performing a user's Home resolution at the Authentication Broker for allowing the Service Provider to request validation of an authentication assertion for that user from the Authentication Provider belonging to the first mobile network.

In particular, the telecommunication system allows the Authentication Provider of the first mobile network operator to be directly accessed, without involving an Authentication Broker, from those Service Providers having such agreement with the first mobile network operator. To this end, the telecommunication system further comprises means for redirecting a user accessing a Service Provider toward an Authentication Provider of the user's Home first mobile network, without involving an Authentication Broker, the Service Provider having such agreement with the Home first mobile network operator. Moreover, such Service Provider may request validation of an authentication assertion for that user from said Authentication Provider without involving an Authentication Broker.

Generally, the above system comprises means for issuing a Single Sign-On authentication request from a user accessing a Service Provider toward an Authentication Provider in the cellular Federation responsible for authenticating the user for that Service Provider, the user being a subscriber of the cellular Federation, and means for presenting a received authentication artifact to the Service Provider.

A method is also proposed by the present invention for providing Single Sign-On services to a user accessing selected Service Providers, the user having subscription with a first mobile network operator, and each selected Service Provider being associated with a second mobile network operator. This method comprises the steps of:
(a) establishing an authentication trust relationship between the first and the second mobile network operators, thus forming a Federation of mobile network operators;
(b) redirecting an access request generated by said user from the selected Service Provider toward the cellular network of said first mobile network operator;
(c) generating at an Authentication Provider of said first mobile network operator, where the user's access request is redirected, an authentication assertion valid for said user accessing said Service Provider, and returning an artifact for said assertion back to said user;
(d) requesting verification of said authentication assertion, included in the artifact presented by the user, from the Service Provider to the Authentication Provider of said first mobile network operator; and
(e) accepting service access to the user upon receipt of a successful verification response at the Service Provider.

In both, the above telecommunication system and method, a user is identified between an Authentication Provider and a Service Provider with a shared identity, independently of the authentication identity used between the user and the Authentication Provider in the cellular Federation, and independently of the user identity used between the user and the Service Provider.

Within the telecommunication system and also taking active part in the above method, there is an Authentication Broker comprising first interfacing means for communicating with a user having subscription with a first mobile network operator, and second interfacing means for communicating with a Service Provider associated to a second mobile network operator. These first and second interfacing means can be regarded as forming a broker channel for enabling the Authentication Broker to redirect the user to the user's Home network, and to resolve the user's Home network for the Service Provider, respectively. Such Authentication Broker may comprise a Web Front End that includes the above first and second interfacing means with user and Service Provider, respectively. In addition, the Authentication Broker further comprises storage for all the Authentication Providers in the cellular Federation on a per mobile network operator basis, each mobile network operator included in the cellular Federation, and means for retrieving from storage user's Home related addressing data. Moreover, the Authentication Broker Web Front End further comprises means for offering Public Key Infrastructure services to those Service Providers associated to the mobile network operator owning the Authentication Broker in order to accomplish the security and privacy requirements of the cellular Federation, thus accomplishing another object of the present invention.

Also within the telecommunication system and taking active part in the above method, there is an Authentication Provider comprising a front channel and a back channel.

The front channel of this Authentication Provider includes a Web Front End that comprises first interfacing means for enabling an authentication session between a user and said Authentication Provider. This front channel further comprises a Session Manager and storage for handling session status for the user, and a Front End Authentication server for carrying out a specific authentication mechanism for the user.

The back channel of this Authentication Provider includes a Protocol Binding that comprises second interfacing means for exchanging information related to user authentication assertion between said Authentication Provider and a Service Provider that the user is accessing. This back channel further comprises a Security Assertion Mark-up Language engine for generating an authentication assertion for a user, and storage for authentication assertions. In addition, there is also provided inter-working means between front channel and back channel for generating and storing an authentication assertion for a user.

As a further advantage of having the above system, method, and apparatus, namely the Authentication Broker and the Authentication Provider, there is provided a method of doing business wherein at least two mobile network operators conform to or are otherwise part of a Federation of mobile network operators, thus establishing an authentication trust relationship in the Federation for supporting Single Sign-On services. The Federation acts as an authentication authority toward those Service Providers offering services to subscribers of mobile network operators included in the Federation, each Service Provider being associated to a federated mobile network operator for accessing such Federation. In this method for doing business, each mobile network operator contributes with its own network and the services provided by its associated Service Providers, each network comprising an Authentication Provider for authenticating subscribers of such network and an Authentication Broker for redirecting the associated Service Providers to an Authentication Provider responsible for authenticating a given user in the Federation. Moreover, each Service Provider in this business method is arranged for offering services to subscribers of any mobile network operator included in the Federation. The Service Provider may access the Federation through a well known Authentication Broker of a mobile network operator having such agreement with the Service Provider and thus having an authentication trust relationship with the Federation.

BRIEF DESCRIPTION OF THE DRAWINGS

The features, objects and advantages of the invention will become apparent by reading this description in conjunction with the accompanying drawings, in which:

FIG. 1 schematically represents the architectural and business reference model of a Cellular Federation for Single Sign-On services;

FIG. 2 shows a simplified sequence diagram representing the process followed to authenticate a user and to authorize access to a service offered by a Service Provider in a basic scenario where the Service Provider has a business agreement with the Mobile Network Operator holding a subscription for such user;

FIG. 3 shows another simplified sequence diagram representing the process followed to authenticate a user and to authorize access to a service offered by a Service Provider in a more generic scenario. In this scenario, the Service Provider has a business agreement with a Mobile Network Operator other than the one holding the subscription for such user, both mobile network operators being included in a Cellular Federation.

FIG. 4 generally presents an exemplary internal architecture and main interfaces involving a user, a Service Provider, an Authentication Broker, and an Authentication Provider.

FIG. 5A shows a first sequence (I) of actions when a user accesses an Authentication Provider (AP) through a so-called Front Channel for initiating a new authentication process or for triggering an assertion process if a valid authentication had been previously performed.

FIG. 5B shows a second sequence (II) of actions carried out to authenticate a user not previously authenticated through a so-called Front Channel at an AP, and with help from an Authentication Back End (hereinafter referred to as "Auth. B/E").

FIG. 5C shows a third sequence (III) of actions carried out to accomplish an assertion process when a user is found to be previously authenticated, therefore having an active session.

FIG. 6 presents a schematic composition that, by including references in FIGS. 5A to 5C, shows the sequence of actions carried out between a user, a Service Provider and an Authentication Provider for authenticating such user who had accessed the service provider without having been previously authenticated.

FIG. 7A presents a schematic composition that, by including references in FIGS. 5A and 5B, shows the sequence of actions carried out between a user and an Authentication Provider during an isolated authentication of such user.

FIG. 7B presents a schematic composition that, by including references in FIGS. 5A and 5C, shows the sequence of actions carried out between a user, a Service Provider and an Authentication Provider for the user, who had been already authenticated, accessing to the Service Provider.

FIG. 8 illustrates a more detailed embodiment of some steps appearing in FIG. 3 in accordance with a preferred architectural model.

FIG. 9 illustrates a more detailed embodiment of some other steps also appearing in FIG. 3 in accordance with a preferred architectural model.

FIG. 10 shows an exemplary relationship between SSO_auth_ID, SSO_MAIN_ID and SHARED_ID identities managed at an Authentication Provider.

DETAILED DESCRIPTION OF A PREFERRED EMBODIMENT

The following describes currently preferred embodiments of means, methods and system for building up a Federation of Mobile Network Operators (MNO) acting as an authentication authority towards associated Service Providers (SP) offering services to the subscribers of any MNO in the Federation. These preferred embodiments are described in conformity with an architectural and business reference model provided by the invention in terms of actors, roles, relationships and basic use cases.

In accordance with an aspect of the present invention, there is provided a cellular Federation for Single sign-On (FSSO) services. The FIG. 1 presents the architectural and business reference model described above in terms of actors, roles, relationships and some exemplary use cases in respect of a first Federation (FSSO-1).

Actors in the reference model in FIG. 1 are Users (User@MNO-A, User@MNO-C), Service Providers (SP-1, SP-2) and subscribers Home Site, the latter being Mobile Network Operators (MNO-A, MNO-B, MNO-C) holding the subscriber subscription. For the purpose of the present invention, a User is a mobile subscriber provided with a Subscriber Identity Module or with a WAP Identity Module (SIM/WIM) and with a web/wap browser; a Service Provider is the target where a service requested by a User resides; and a Home Site is a Mobile Network Operator holding the subscription of the User.

Roles played in the reference model in FIG. 1 are Users (User@MNO-A, User@MNO-C), Destination site, Authentication Broker (AB) and Authentication Provider (AP). A User is in this context a Client requesting a service from an SP; a Destination Site is a site capable of delivering a given service to a Client, in general an SP though an MNO may also play this role for some services; an Authentication Broker (1, 2) is a member of the Federation (FSSO-1) intended for acting as the entrance point to the Federation for associated SP's (SP-1, SP-2); and an Authentication Provider (4, 5, 6) is a member of the Federation (FSSO-1) intended for owning user data and the only one able to authenticate and provide user information to the Destination Site. In particular, an SP (SP-1, SP-2) always accesses (S-100, S-200) the Federation through its associated AB (1, 2). For the sake of simplicity, SP's are not considered members of the Federation, being thus referred to as associated entities.

From a business perspective, each particular MNO (MNO-A, MNO-B, MNO-C) does not only contribute to the Federation with its own cellular network but also with a number of associated SP's (SP-1, SP-2) with which it has signed particular agreements. These associated SP's may always access (S-100, S-200) to the Federation via the Authentication Broker (1, 2) of a particular MNO (MNO-A, MNO-B) with which each SP (SP-1, SP-2) has signed such agreement. This is particularly important, because cellular operators may want to keep established business agreements with SP's after joining or building a Federation (FSSO-1, FSSO-2). Furthermore, a network operator can leverage the services of respective SP's in markets where they have strong positions, which would be the case for a cellular multinational federation where service providers tend to sign Service Level Agreements (SLA) with local operators.

The rationale behind this reference model from a business perspective relies on the fact that it gives equal opportunity to cellular operators when building or joining the Federation, because a federation member always plays the role of authentication provider towards its own subscribers. Additionally, though not necessarily, a federation member may also play the role of authentication broker towards subscribers from other members of the Federation for its associated SP's.

More specifically, an Authentication Broker (1, 2) is responsible for resolving the user's Home Site. That is, the AB is in charge of providing an associated SP with enough information to enable the exchange of user data between the MNO holding the subscription of a user and the SP. Once the user's Home Site has been resolved, the AB is able to redirect the user to the user's Home Site. In addition and optionally, an AB may offer Public Key Infrastructure (PKI) services to its associated SP's in order to accomplish security and privacy requirements characteristic of the Mobile Network Operators.

Different relationships in the reference model in FIG. 1 deserve particular explanations prior to further describing architectural entities and interfaces, and the rationale behind currently preferred embodiments. In this respect, a user (User@MNO-A) (User@MNO-C) has a trust relationship (R-110, R-120) (R-320) with his Home Site (MNOA) (MNO-C). When the user is registered with an SP (SP-1) (SP-2), there is a direct trust relationship (R-110) (R-120, R-320) as well between both the user (User@MNO-A) (UserXMNO-C) and the SP (SP-1) (SP-2). For the sake of clarity and in order to simplify the relationships between SP's and the Federation, it has been considered that each SP (SP-1) (SP-2) has a single trust relationship (S-100) (S-200) with one and only one federation member, namely an AB (1) (2), of a Mobile Network Operator (MNO-A) (MNO-B) with which the SP has signed a business agreement.

Therefore, when a user (User@MNO-A, User@MNO-C) wants to use a cellular SSO service at a given SP (SP-1, SP-2), the SP automatically redirects the user's request via the SP's entrance point to the cellular federation, namely an AB (1, 2), to a site in the federation, namely an AP (4, 6), that can properly handle the user's request. This avoids the SP making complex decisions as to where the user should be redirected. This also substantially simplifies the interaction between an SP and the Federation, minimizing impacts on the SP's and thus increasing their willingness to associate with the Federation. In a more general and actual scenario an SP (SP-2) may have a trust relationship with different federations like, for example, a cellular federation (FSSO-1) and an e-bank federation (FSSO-2).

In another embodiment of the present invention, an SP (SP-1) associated with a particular MNO (MNO-A) does not need go through an AB (1) of such MNO for accessing the AP (4) in the MNO holding the subscription for the user (User@MNO-A) who has requested a service in such SP (SP-1). This is especially advantageous for a trust relationship (R-110) between a MNO (MNO-A) and an associated SP (SP-1), and, in particular, it optimizes network access and performance.

Notwithstanding this another embodiment, and generally speaking, all Home Sites that want to play the role of Authentication Broker have a trust relationship with all the federation members because they also are members of the Federation. As explained above, an SP is able to redirect all users to its entry point, namely a cellular operator (MNO) or a Home Site, within the cellular Federation. Therefore, the Authentication Broker (AB) needs to know about all federated Home Sites.

However, an AB does not normally know the users of each Home Site of the Federation, since this requires each AB being able to populate all users of the Federation, what requires the provision of additional means for users capacity and availability control. Nevertheless, by reading throughout the currently preferred embodiments described in accordance with the invention, it will be appreciated that a unique or reduced number of AB (1, 2) provided with these additional means for users capacity and availability control, as well as with database facilities for a huge amount of subscribers, may be suitable for a certain type of cellular Federation. For example, such Cellular Federation might be a Federation comprising a plurality of national MNO's belonging to a global corporation with facilities spread across the world.

Two main representative use cases may be described with reference to the scenario presented in FIG. 1 and for which more precise details are further explained in exemplary embodiments from an architectural point of view.

A first use case may be a user (User@MNO-A) accessing a certain Service Provider (SP-1), such as for instance a Bookstore Service Provider, wherein the Service Provider (SP-1) is associated with the cellular SSO Federation (FSSO-1) through a particular mobile network operator such as MNO-A. As shown in FIG. 2, the process followed to authenticate such user and to authorize such service starts when a subscriber of an MNO-A (User@MNO-A) requests access (C-21) to a Bookstore Service Provider (SP-1). Given that this SP has a business agreement with MNO-A, and thereby with the cellular Federation that MNO-A belongs to (FSSO-1), the SP-1 redirects (C-22) the request to the MNO-A Home site. Upon reception at the MNO-A Home Site of the user's request for accessing the SP service (C-23), the user presents his own MNO-A identity, for example with a cookie. At this point two possible embodiments, already commented upon, may be applicable. More particularly, either the MNO-A acting as an Authentication Broker internally determines that MNO-A is also the Authentication Provider for that user, or else AB and AP at the MNO-A are both involved as in a more general use case, as described hereafter.

Provided that the user had not been authenticated yet at MNO-A, the authentication procedure is performed. If the user was already authenticated, he presents a cookie to MNO-A for allowing MNO-A to check the status of a given user's session. The authentication is not specific for each SP unless the SP requests a specific authentication mechanism to be performed. MNO-A creates (C-24) an authentication assertion for that user specifically addressed to the SP. Then, an artifact referring to the user's authentication assertion likely including other authentication information is sent back (C-25) to the user. Artifacts are of one time usage and only valid for the specific SP they are addressed to. The user on its own presents (C-26) this artifact to the SP-1. The SP then verifies that the source of the artifact is valid and requests (C-27) the referred user's authentication assertion to the Home site (MNO-A). The MNO-A sends back (C-28) the complete user's assertion with the required user data including at least authentication information. The SP-1 thus analyses the user's assertion and trusts the authentication performed by the user's Home Site (MNO-A). Eventually, the SP-1 informs (C-29) the user about the service access acceptance.

A second use case may be a user (User@MNO-A) accessing a certain Service Provider (SP-2), such as for instance a Travel Agency Service Provider. Said Service Provider (SP-2) is thus associated with the cellular SSO Federation (FSSO-1) through a particular cellular operator such as MNO-B, whereas the user is a subscriber of another cellular operator (MNO-A) also member of the Federation. As shown in FIG. 3, the process followed to authenticate such user and to authorize such service starts when a subscriber of an MNO-A (User@MNO-A) requests access (C-21) to a Service Provider like a Travel Agency Service Provider (SP-2) for example. This SP-2 has a business agreement with MNO-B to offer SSO services to its users and to the users of the other members of the cellular Federation (MNO-A, MNO-C). When the SP-2 receives (C-21) the user's request for SSO, the SP-2 redirects (C-22) the request to the MNO-B site, since said MNO-B is the single point of entrance for this SP to the Federation. Thus, MNO-B plays the role of Authentication Broker in this use case and receives (C-33) a user's redirection from the SP-2. For the sake of SP simplicity, the SP does not know all home sites of the Federation and therefore no information about the user's Home Site is passed in the redirection message. Next, the MNO-B requests (C-34) the user's Home Site name. It has been considered in this reference model that the user identity is only known at his Home Site. An alternative is the sharing of user identities within the cellular Federation, however, this leads to the need of huge central directories with corresponding management tasks.

In response to request (C-34) the user answers back (C-35) with his Home domain name to MNO-B site, namely to the current Authentication Broker (2). Then, the Authentication Broker (AB) redirects (C-36) the user to his Home Site, that is, MNO-A. Following this, the user requests access (C-23) for the SP-2 to his Home Site. In like manner to the previous use case, if the user is not authenticated yet at MNO-A, the authentication procedure is performed (C-24) and an artifact referring to the user's assertion with the authentication information is sent back (C-25) to the user. At this point, the user is able to present (C-26) this artifact to the SP-2. Then, the SP-2 must verify the source of the artifact and resolve the user's home. The SP-2 requests (C-37) this information from the AB (2). The AB (2) sends back (C-38) the user's Home resolution response so that the SP-2 can contact (C-27) the user's Home Site (MNO-A) to get the referred user's assertion. MNO-A sends back (C-28) the complete user's assertion with the required user data including at least authentication information. Then, the SP-2 analyses the user's assertion and trusts the authentication performed by the user's Home Site. Eventually, the SP-2 allows (C-29) the user to access the service.

After having presented an overview of the architectural and business reference model in terms of actors, roles, trust relationships, and some exemplary use cases illustrated in FIG. 1 to FIG. 3, further detailed embodiments may be introduced in respect of a preferred architecture suitable for supporting Federated Single Sign-On (FSSO) services at each Mobile Network Operator (MNO) included in a Federation of a plurality of MNO's.

Such architecture is described with reference to the external interfaces between Federation members, Service Providers and Users. These interfaces include an interface between a User, or rather a User Equipment (UE), and the Authentication Broker (hereinafter UE-AB i/f); another interface between the User or UE and the Authentication Provider (hereinafter UE-AP i/f); another interface between the Service Provider and the Authentication Provider (hereinafter SP-AP i/f); and another interface between the Service Provider and the Authentication Broker (hereinafter SP-AB i/f).

These interfaces, or combinations thereof, provide channels for communicating between the different entities involved, internal and external to the Federation. These channels, depicted in FIG. 4, provide the bases for a suitable architecture.

Thus, the UE-AB i/f allows the AB to redirect the user to the AP responsible for his authentication. This interface supports such redirection, for example, by the user providing the AP name to the AB and the AB translating it to an entrance point in the AP site. Anyone skilled in the art would easily appreciate other approaches or techniques to achieve a similar result. This communication interface is part of the so-called "Broker Channel (AB)" (1, 2) in the Home Site.

The UE-AP i/f supports an authentication session between both actors, the User and the Authentication Provider (4, 5, 6). Once authenticated, the User is redirected to the SP with a sort of token or credentials. This communication interface is referred to as the "Front Channel (AP)" (4') in the Home Site.

The SP-AP i/f is mainly used to exchange user information like authentication, attributes, authorization, and assertions. This communication is transparent to the user, and hereinafter referred to as the "Back Channel (AP)" (4") in the Home Site.

The SP-AB i/f supports the establishment of the back channel wherein, for example, the AB translates the source ID contained in the artifact to an entrance point in the user's AP or PKI support. This interface is also part of the so-called "Broker Channel (AB)" (1, 2) in the Home Site.

Thus, FIG. 4 also shows functional components that an MNO may support in order to become an AP and an AB in an F-SSO solution. As shown in this drawing, the architecture can be regarded as comprising a Front Channel, a Back Channel and a Broker Channel view. Thus, an Authentication Provider (4, 5, 6) may be regarded as comprising a Front Channel (4') and a Back Channel (4"). The Front Channel is intended for controlling the authentication of a user and for managing a master session between the user and the AP A significant amount of the control logic needed to deploy the F-SSO service is located in the entities of the front channel. The Back Channel is intended for handling a direct communication between the SP and the AP for exchanging user information. The Broker Channel is responsible for supporting the address resolution needs of the SP and the user.

Regarding the aforementioned master session, additional detailed considerations have to be introduced regarding sessions handling. In this respect, when a user requests an F-SSO service, several sessions need to be created and maintained as follows:

A Master session between the user and the AP. Once the AP authenticates a user, the AP creates a session and leaves an encrypted cookie in the user's browser for subsequent authentication queries.

A Service session between the user and the SP in order to be able to make use of services offered at the SP. Cookies might also be used for this session management.

The AP needs to keep track of the Service sessions established between users and each SP. For this reason, in accordance with an aspect of the present invention and as shown in FIG. 4, the AP comprises an SSO Session Manager (41) that, being preferably located at the Front Channel, inter-works with the Back Channel and is interconnected with an AP Web Front End (42) located at the Front Channel as well. Moreover, the AP includes a Session Database (43) for storing and maintaining such information, the Session Database preferably being located at the Front Channel and interconnected with the SSO Session Manager (41).

Prior to the introduction of a more detailed description of currently preferred embodiments for the use cases presented above and depicted with reference to FIG. 2 and FIG. 3, the different user identifiers that the different actors handle in this architectural model will be described.

In this respect, users must present an unambiguous identity to their Authentication Provider for performing an SSO service request, a so-called "single sign-on authentication identity" (hereinafter referred to as SSO_auth_ID), and which may have at least any of the following formats for the purpose of the present invention:

MSISDN/IMSI, which pertains to access to and from a mobile phone

User@domain or use@grealm, e.g. user@mno.com

Username (string of characters)

The Authentication Provider (AP) may administer a plurality of the SSO_auth_ID's for each user, but needs to define a so-called "Main Single Sign-On Identity" (hereinafter referred to as SSO_MAIN_ID) for each user that correlates the plurality of SSO_auth_ID's. This SSO_MAIN_ID is intended for operator purposes, more specifically for the AP, and its format is left up to the operator, that is, it may or may not match an SSO_auth_ID pertaining to the user.

On the other hand, Internet related users have a wide variety of user identities with different service providers. Users may wish to keep current diverse identities per service provider to access accounts at each site. For the purpose of the present invention such identity is referred to as "service provider user identity" (hereinafter SP_user_ID) and represents the identity of a user at a given Service Provider (SP) This SP_user_ID has meaning only between an owning user and a given SP.

The previous paragraphs describe the SSO_MAIN_ID of a user as a correlating key to at least one SSO_auth_ID that uniquely authenticates a user at the user's home operator, namely at an AP, and describe the SP_user_ID that identifies the user at a given Service Provider. In a generic scenario the SSO_MAIN_ID, the SSO_auth_ID, and the SP_user_ID do not match each other, and a user does not wish to furnish either identity to other actors. In this case, the user may be known to the SP and to the AP with an identity that is shared between both, the so-called SHARED_ID. This SHARED_ID may either be permanent or temporary depending on the specific scenario considered. This identity can be considered an opaque handling used by the SP and the AP for referring to the same user.

Thus, in accordance with an aspect of the present invention, an Authentication Provider correlates the SSO_auth_ID, SSO_MAIN_ID and SHARED_ID whereas a Service provider correlates SP_user_ID and SHARED_ID. An exemplary relationship between these identities is shown in FIG. 10 in a non-restrictive manner. The way these identities are administered by the different actors, as well as how these identities are linked to each other, is not described further for purposes of the present invention.

In accordance with the architectural model described above and illustrated in FIG. 4, further detailed embodiments are provided for particular aspects of the use cases described above with reference to sequences in FIGS. 2 and 3 respectively. As already mentioned for these use cases, when a user requests (C-23) an SSO Authentication to his Home Site for accessing an SP, different actions may be required depending on whether or not the user had been previously authenticated.

Thus, by including three sequenced sets of actions (Sequence I, II, and III) respectively depicted in FIG. 5A to FIG. 5C, the embodiment in FIG. 6 describes the details of the use case in FIG. 2 under the architectural model in FIG. 4, wherein the user accessing an SP has not been authenticated yet by his Home network.

The mechanism in FIG. 6 starts when a user accesses (C-21) an SP, and is redirected (C-22) to his Home Site. Then, the first sequence (I) in FIG. 5A shows the user issuing an SSO Authentication http request (C-23') from his own web server. The user identification could be done by means of an encrypted cookie (C-23"), if there is one stored in the user's web agent from a previous SSO session that took place in the past. The encryption of the cookie is recommended to avoid revealing the user identity, SSO_MAIN_ID, in case someone else obtains such cookie, either by physically accessing the computer used for the SSO session or by means of scripts intended to steal cookies from web browsers. Since the cookie is generated and encrypted by the AP, and later on, decrypted also by the AP, the encryption algorithm and key management is completely left up to the AP. The user web browser does not need understand the cookie content. In order to secure this process and to prevent stealing cookies in the network path to the web server, the connection might always be done over an https. The user identity to be stored in that cookie should be the one selected as SSO_MAIN_ID. It would be convenient to use an identity other than the MSISDN or the IMSI for privacy reasons.

More specifically, the user web browser is directed to the Web Front End (42) (hereinafter Web F/E) located at the AP Front Channel. The first time the user accesses it, a plug-in is automatically downloaded with the software that implements the client side of the authentication web service, such as a Simple Object Access Protocol (SOAP) client Subsequently, the Web F/E interfaces (C-500) the SSO Session Manager (41) to determine if there is an active session associated with the relevant IMSI, or with other user identity used for a similar purpose. In the present case, there will not be any session active at this point, since the user was not previously authenticated.

The process in FIG. 6 continues with the second sequence (II) as shown in FIG. 5B wherein the SSO Session Manager (41) informs (C-501) the Web F/E that there is no active Session. Thus, the user is informed that his authentication is required (C-502). When the user gets to the Web F/E in the AP Front Channel, he may choose (C-503) to be authenticated via the SIM card, among the different authentication mechanisms available for the user, and then the SOAP client invokes such service. Notice that the SOAP client might be downloaded after the user has chosen this authentication mechanism instead of before, without affecting the scope of the invention. When the user wants to be authenticated with the SIM card, it is assumed that the identity to be presented (C-505) to the Web F/E is the IMSI, stored in the SIM. The IMSI should preferably be sent in the SOAP request assuming that the dialog is carried over a secure connection, namely https, without risking security requirements. The SSO Session Manager is contacted (C-506) again and, detecting that the user does not have an active session established, it acts as a RADIUS client and requests access (C-507, C-508) to an Authentication, Authorization and Accounting (AAA) server (44). Provided that a SIM-based authentication had been selected, the IMSI is used as applicable identity and is encapsulated in an Attribute Value Pair (AVP) of an Extensible Authentication Protocol (EAP) and in the User-Name AVP.

At this stage, and depending on the authentication mechanism to use, the AAA server (44) may request (C-509, C-510) the provision of an Authentication Challenge to a Back End Authentication Server (72) (hereinafter "B/E Auth. Server"). This "B/E Auth. Server" is preferably reached via RADIUS messages which routing might be done in terms of the realm part of a Network Access Identifier (NAI). The SSO Session Manager thus acting as a RADIUS client can modify such NAI realm. Once the "B/E Auth. Server" receives the access request message including the user authentication identity and credentials in EAP APV, the "B/E Auth. Server" may require further credentials (C-510 to C-517), this process involving more EAP roundtrips.

Once the AAA server (44) has successfully authenticated the user, it sends an Access Accept message back (C-518) to the SSO Session Manager. The SSO Session Manager (41) must create now an entry for that user in the session database, including the SSO_auth_ID and the SSO_MAIN_ID. If the SSO Session Manager does not know the SSO_MAIN_ID yet, it queries (C-519) an Identity Manager (70) by providing the SSO_auth_ID as the look-up key for that user. Additional advantages may be encountered by having a Common Directory Service (hereinafter referred to as CDS) for storing SSO_MAIN_ID's, and for providing them (C-522) to the SSO Session Manager at a request via the Identity Manager (C-520, C-521). At this point, the SSO Session Manager (41) creates an entry, namely a session, for that user in the Session Database (43) by including the particular SSO_auth_ID used during such user authentication and the SSO_MAIN_ID. Once this entry has been created in the SSO Session Manager, additional logic in the Web F/E not shown in FIG. 5B must maintain the session state between subsequent http requests, for example by sending a cookie to the user web browser.

It will be appreciated that during this authentication process there has been no relationship with the AP Back Channel and no assertions have yet been generated. Only a new session has been created for a given user, including the SSO_MAIN_ID, the SSO_auth_ID, a selected authentication mechanism, and addressing information like an IP address, or an MSISDN belonging to the user.

Following sequence II, the process in FIG. 6 continues with the third sequence (III) as shown in FIG. 5C. The SSO Session Manager (41), after having a valid session for a given user, fetches (C-550, C-551) from the Identity Manager (70) the identity of that user for the corresponding Service Provider (SP), namely a SHARED_ID. This SP is the one that originated the initial request, by redirecting the user to his Home Authentication Provider (AP). Though not shown in FIG. 5C, this SHARED_ID and the corresponding SP, for which such identity is used, are stored in the Session Database (43) associated with the master session entry for that user.

Once the above identity mapping has been done, the SSO Session Manager (41) invokes (C-552) a service in a Security Assertion Mark-up Language (SAML) engine (45), in order to generate an authentication assertion for the given SHARED_ID and for the given Service Provider. The assertion includes other relevant data, such as the date and time when the authentication process took place, and the associated security strength of the concrete authentication mechanism. The assertion is stored (C-553) in the Assertion Database (46), likely indexed by an assertion reference. Thus, the assertion is given an "assertion reference" to uniquely identify it later on. The assertion reference is encoded in an authentication Artifact at the SAML engine, which is returned (C-554) to the SSO Session Manager for further submission via the AP Web F/E (C-555) to the user (C-25).

Such artifact is preferably returned to the user encoded as a part of the URL, namely a parameter. At the same time, the user web browser is redirected back to the original URL that was sent to the SP. Actually, this information came as a parameter in the URL received at the first redirection from the SP to the AP. Therefore, the original URL that came from the SP, the target resource, should have been stored at the AP Web F/E.

Thereafter, the user presents the artifact (C-26) to the originally contacted SP. The SP takes the artifact, and after decoding, extracts the assertion reference and the identity of the AP that issued the assertion. The SP uses this information to establish a SAML dialog (C-27) with the AP Back Channel (4''), and requests the original assertion, by presenting the artifact in the SAML assertion request message. When the SAML engine (45) in the AP Back Channel receives the request for an assertion (C-27), it fetches the assertion (C-556, C-557) from the Assertion Database (46), digitally signs it, and sends it back to the SP (C-28).

The SP then checks the validity of the assertion, preferably by making use of its own Public Key Infrastructure (PKI) or, in a more generic case further explained, by making use of the PKI of a trusted authentication broker.

Once the assertion has been proved valid at the SP and the origin has been found to be trusted, the SP can proceed to parse the assertion content and enforce his local policies according to the authentication facts included in the assertion. Finally, the user is informed (C-29) of the service access acceptance.

It will be appreciated that the above description in respect of FIG. 6, with preferred embodiments explained in FIGS. 5A to 5C, provide architectural details for the use case previously presented in respect of FIG. 2. These architectural details are intended to be understood in an explanatory and non-restrictive manner.

By including the three sequenced sets of actions (Sequence I, II, and III) respectively depicted in FIG. 5A to FIG. 5C, embodiments in FIGS. 7A and 7B also describe details of the use case in FIG. 2, under the architectural model in FIG. 4, wherein the user accessing an SP has already been authenticated by his Home network. More specifically, FIG. 7A presents an isolated authentication of a user before an Authentication Provider at his Home network, whereas FIG. 7B presents the actions carried out when the user accesses an SP, and once redirected to his Home network the user is found to be already authenticated and having a valid session still alive.

The mechanism in FIG. 7A directly starts with the first sequence (I) shown in FIG. 5A wherein the user issues an SSO Authentication http request (C-23') from his own web server followed, if available, by a user identification with an encrypted cookie (C-23") sent towards the Web F/E at the AP Front Channel as in the corresponding sequence shown in respect of the use case in FIG. 6. Afterwards, the Web F/E interfaces (C-500) the SSO Session Manager (41) to check if there is an active session associated with that user. The sequence flow follows with the second sequence (II) shown in FIG. 5B wherein the authentication procedure, as likely selected by the user, is carried out. In particular, once the SSO Session Manager (41) has created a session for the user in the Session Database (43), in fact by including the particular SSO_auth_ID used and the SSO_MAIN_ID, the SSO Session Manager informs the AP Web F/E wherein additional logic not shown in FIG. 5B maintains the session state for subsequent http requests. Eventually, as shown in FIG. 7A the AP Web F/E acknowledges (C-70) a successful Sign-On towards the user web browser.

This user already authenticated may request (C-21) a service access to an SP. This SP, under the assumptions stated above for the use case in FIG. 2 wherein an Authentication Broker is not needed, redirects (C-22) the user to his Home Site. Then, following the sequence in FIG. 5A, the user accesses once more the given AP Web F/E (42) from which an indication is issued toward the SSO Session Manager (41) to check whether or not a valid session is still alive. Next, the SSO Session Manager (41) likely in cooperation with a Session Database (43) finds out that a session already exists for that user. Then, as shown in the third sequence (III) depicted in FIG. 5C, the SSO Session Manager (41) fetches (C-550, C-551) a SHARED_ID to be used for that SP, orders (C-552, C-553, C554) the generation and storage of an assertion for said SHARED_ID and its inclusion in an authentication artifact. The artifact is returned via the Web F/E (C-555) to the user (C-25) and presented (C-26) as in the use case before to the SP. The SP then checks the original assertion (C-27, C-556, C-557, C-28) with the AP Back Channel (4"), and eventually offers (C-29) service access acceptance to the user.

Detailed embodiments for the use case in FIG. 2 have been described in the preceding paragraphs distinguishing a first behavior in FIG. 6, where the user accesses an SP without having been authenticated yet, from a second behavior in FIGS. 7A and 7B where the user is first authenticated and then given service acceptance.

In accordance with another aspect of the present invention, the use case previously explained with reference to FIG. 3 is now further described in respect of the architectural model shown in FIG. 4. In particular, embodiments derived from the inclusion of an Authentication Broker and corresponding new interfaces are differentiated.

Thus, as illustrated in FIG. 3, a second use case occurs when a user (User@MNO-A) accesses a certain Service Provider (SP-2) that is associated to a cellular SSO Federation (FSSO-1) through a particular cellular operator such as MNO-B, whereas the user is a subscriber of another cellular operator (MNO-A) which is also a member of the Federation. In this second use case an Authentication Broker (AB) is needed in accordance with an aspect of the present invention for receiving the redirection from the SP (SP-2), resolving the user's Home Site, and redirecting to the MNO where the user belongs.

In this respect, FIG. 8 shows the actions to be carried out between the user and the AB before redirecting said user to an appropriate Authentication Provider (AP) at the user's Home Site. More specifically, FIG. 8 shows these actions with reference to the architectural model illustrated in FIG. 4 whereas FIG. 3 does not take into account all particular devices that an AB might comprise. Thus, when a user issues an Authentication request for the SP-2 (C-33) toward the Authentication Broker (AB) as in FIG. 3, there is actually a http redirection received in an AB Web F/E (21) at a Broker Channel (2) as FIG. 8 shows. Then, a user's Home Site name is requested from the AB Web F/E (C-34, C-35). This request may be done, for instance, by presenting a web page to the user with all the AP's in the Federation, wherein the user only has to click on the logo of his Home operator. Next, a URI for the user's Home Site is obtained (C-84, C-85) from an Authentication Provider (AP) Database (22). Eventually, the AB Web F/E (21) redirects (C-36) the user's http to the appropriate AP at his Home Site. The AB may leave a cookie in the web browser of the user in order to avoid further user's Home related queries in successive iterations. The flow sequence goes on with an SSO Authentication request (C-23, C-23', C-23") toward the AP Web F/E (42) as described above in respect of use cases illustrated in FIG. 6 or FIGS. 7A and 7B.

FIG. 9 shows the actions to be carried out between a Service Provider and an AB for a user's Home resolution in order to find where the assertion should be validated. More specifically, FIG. 9 shows these actions with reference to the architectural model illustrated in FIG. 4, whereas FIG. 3 does not take into account all particular devices that an AB might comprise. After the user has presented (C-26) the artifact to the SP (SP-2) as illustrated in FIGS. 3 and 9, a user's Home resolution is requested (C-37) to the AB. Such request is received at the AB Web F/E (21) at the Broker Channel (2). Then, the AB Web F/E (21) requests (C-91, C-92) from an AP Database (22) a URI of the AP at the Home Site that is sent back (C-38) to the SP. The SP, by using preferably DNS techniques, resolves the Home URI and eventually validates (C-27, C-28) the authentication assertion, which was previously obtained (C-23, C-24, C-25) as shown in FIG. 3 or, more specifically, as described above in respect of use cases illustrated in FIG. 6 or FIGS. 7A and 7B. The validation of the authentication assertion (C-27, C-28) is issued from the SP (SP-2) toward the SAML engine (45) likely via a Protocol Binding (47), which is advantageously interposed between the SAML engine and the SP. This Protocol Binding (47) component is arranged for untying an XML instance from a transport protocol, like httms for example, and passing it over the SAML engine. The SP is thus entitled to make any type of query as defined in SAML standards.

With regard to the check of validity of the assertion in this latest use case, the SP does not need to implement all the PKI complexity, and neither do it for locally installing certificates from all Authentication Providers in the Federation, but just the certificate of its trusted entity in said Federation, namely the certificate of the AP hosting this Authentication Broker.

Obviously, many modifications and variations of the present invention are possible in light of the above teachings. It is therefore to be understood that within the scope of the disclosed concept, the invention may be practiced otherwise than as has been specifically described.

What is claimed:

1. A telecommunication system providing Single Sign-On services to a user accessing selected Service Providers, the user having a subscription with a first mobile network operator, the system comprising:
a first mobile network and at least one second mobile network;
at least one of a plurality of Service Providers for providing services to subscribers of said mobile networks once said subscribers have been authenticated for the at least one Service Provider by an authentication authority, wherein said authentication authority comprises:
a cellular Federation of mobile network operators, the cellular Federation including the first mobile network and the at least one second mobile network;
an Authentication Provider belonging to the first mobile network as the only member of said Federation entitled to authenticate said user toward the at least one Service Provider; and
an Authentication Broker belonging to a particular one of said second mobile networks and arranged to act as the entry point to said Federation from those Service Providers respectively having entry point agreements with the operator of said particular second mobile network;

wherein said Authentication Provider belonging to the first mobile network operator may be directly accessed, without involving an Authentication Broker, from the Service Providers respectively having entry point agreements with said first mobile network operator;

means for redirecting said user, when said user is accessing a Service Provider, toward an Authentication Provider of said user's Home mobile network operator, without involving an Authentication Broker, when said accessed Service Provider has an entry point agreement with said user's Home mobile network operator;

wherein a Service Provider that has an agreement with said first mobile network operator may request validation of an authentication assertion for a user to an Authentication Provider of said first mobile network operator without involving an Authentication Broker.

2. The telecommunication system of claim 1 further comprising:

means for redirecting said user, when said user is accessing a Service Provider, toward an Authentication Broker of a second mobile network operator having an entry agreement with the accessed Service Provider; and means for redirecting the user, when accessing said Authentication Broker, toward an Authentication Provider at said user's Home network.

3. The telecommunication system of claim 2 further comprising means for performing said user's Home resolution at an Authentication Broker of a second mobile network operator having an entry point agreement with a Service Provider, for allowing the Service Provider to request validation of an authentication assertion for said user to an Authentication Provider of a first mobile network.

4. The telecommunication system of claim 3 further comprising:

means for issuing a Single Sign-On authentication request from said user, when said user is accessing a particular Service Provider, toward an Authentication Provider responsible for authenticating said user for said particular Service Provider, the user being a subscriber of the cellular Federation; and means for presenting the received authentication artifact to said particular Service Provider.

5. The telecommunication system of claim 1 further comprising:

means for issuing a Single Sign-On authentication request from said user, when said user is accessing a particular Service Provider, toward an Authentication Provider responsible for authenticating said user for said particular Service Provider, the user being a subscriber of the cellular Federation; and means for presenting the received authentication artifact to said particular Service Provider.

6. The telecommunication system of claim 1, wherein said user is identified between a given Authentication Provider and a given Service Provider by means of a shared identity independently of the authentication identity used between said user and said given Authentication Provider, and independently of the user identity used between said user and said given Service Provider.

7. The telecommunication system in claim 6 further comprising at least one of the components in a group of components including:

Public Key Infrastructure means for accomplishing security and privacy requirements of mobile networks in the cellular Federation;

an Identity Manager for maintaining and handling relationships between identities for said user under cellular Federation premises and those identities for said user under respective Service Provider premises;

Common Directory Service means for storing user identities accessible by a Single Sign-On main Identity; and a Back End Authentication Server intended for generating an authentication challenge that depends on an authentication mechanism selected by said user.

8. A method for providing Single Sign-On services to a user accessing selected Service Providers, the user having a subscription with a first mobile network operator, and each selected Service Provider being associated with a second mobile network operator, the method comprising the steps of:

(a) establishing an authentication trust relationship between the first and the second mobile network operators, thus forming a Federation of mobile network operators;

(b) redirecting an access request generated by said user from a particular one of said Service Providers toward the cellular network of said first mobile network operator;

(c) generating at an Authentication Provider of said first mobile network operator, to which said user's access request is redirected, an authentication assertion valid for said user accessing said particular Service Provider, and returning an artifact for said assertion back to said user;

(d) requesting verification of said authentication assertion, which is included in said artifact presented by the user, from said particular Service Provider to said Authentication Provider of said first mobile network operator; and (e) accepting service access to said user upon receipt of a successful verification response at the said particular Service Provider.

9. The method of claim 8, wherein both first and second mobile network operators are included in the cellular Federation, and the step a) of this method further comprises one of the following steps depending on the mobile network operator which the selected Service Provider is associated with:

(a1) determining an Authentication Provider of the first mobile network operator in charge of said user, when the selected Service Provider is associated to the first mobile network operator; or (a2) redirecting the access request generated by said user from said selected Service Provider toward an Authentication Broker of a particular second mobile network operator, when the selected Service Provider is associated with said second mobile network operator, said Authentication Broker responsible for determining an Authentication Provider of the first mobile network operator that is in charge of said user.

10. The method of claim 8, wherein the step b) comprises the steps of:

(b1) receiving a Single Sign-On authentication request from said user;

(b2) determining whether or not said user had been previously authenticated;

(b3) performing a challenge/response authentication procedure accordingly with user preferences for the user accessing said selected Service Provider, provided that said user had not been already authenticated, thus not having a valid session active and (b4) storing an assertion generated for said user accessing said selected Service Provider.

11. The method of claim 8, wherein both first and second mobile network operators are included in the cellular Federation, and the step c) of this method further comprises one of the following steps depending on the mobile network operator which the selected Service Provider is associated with:
   (c1) determining an Authentication Provider of the first mobile network operator responsible for validating the assertion presented by said user, when the Service Provider is associated with said first mobile network operator; or
   (c2) requesting resolution of said user's Home Site from said selected Service Provider toward an Authentication Broker of a particular second mobile network operator, when said selected Service Provider is associated with said second mobile network operator, this Authentication Broker responsible for determining an Authentication Provider of the first mobile network operator responsible for validating the assertion presented by said user.

12. The method of claim 8, wherein the step d) further comprises the steps of:
   (d1) retrieving a stored authentication assertion for said user accessing said selected Service Provider; and
   (d2) returning said assertion verification response to said selected Service Provider.

13. The method of claim 8, wherein said user is identified between an Authentication Provider and a Service Provider with a shared identity independently of the authentication identity used between the user and the Authentication Provider, and independently of the user identity used between the user and the Service Provider.

14. An Authentication Broker included in a telecommunication system providing Single Sign-On services to a user accessing selected Service Providers, the user having a subscription with a first mobile network operator, and each selected Service Provider being associated with a second mobile network operator, said Authentication Broker comprising: an Authentication Broker Web front End that includes first interfacing means for communicating with a user having a subscription with a first mobile network operator, and second interfacing means for communicating with a Service Provider associated with a second mobile network operator; a broker channel formed from said first and second interfacing means for enabling the Authentication Broker to redirect said user to said user's Home network, and for resolving said user's Home network for said Service Provider, respectively; and storage for all the Authentication Providers in the cellular Federation on a per mobile network operator basis, each mobile network operator included in the cellular Federation.

15. The Authentication Broker of claim 14, wherein both the user and the authentication broker belong to the first mobile network operator, and a number of selected Service Providers are associated with said first mobile network operator.

16. The Authentication Broker of claim 14, wherein the Authentication Broker Web Front End further comprises means for retrieving said user's Home related addressing data from said storage.

17. The Authentication Broker of claim 16, wherein the Authentication Broker Web Front End further comprises means for offering Public Key Infrastructure services to those Service Providers associated with the mobile network operator owning the Authentication Broker, in order to accomplish the security and privacy requirements of the cellular Federation.

18. An Authentication Provider included in a telecommunication system providing Single Sign-On services to a user accessing selected Service Providers, the user having a subscription with a first mobile network operator, and each selected Service Provider being associated with a second mobile network operator, said Authentication Provider comprising:
   a front channel including a Web Front End that comprises first interfacing means for enabling an authentication session between said user and said Authentication Provider, a Session Manager and storage for handling session status for the user, and a Front End Authentication server for carrying out a specific authentication mechanism for the user; and
   a back channel including a Protocol Binding that comprises second interfacing means for exchanging information related to user authentication assertion between said Authentication Provider and a selected Service Provider that the user is accessing.

19. The Authentication Provider of claim 18, wherein the back channel of the Authentication Provider further comprises a Security Assertion Mark-up Language engine for generating an authentication assertion for the user, and storage for authentication assertions.

20. The Authentication Provider of claim 19, further comprising inter-working means between front channel and back channel for generating and storing an authentication assertion for the user.

21. The Authentication Provider of claim 20, wherein operation of the inter-working means between front channel and back channel is performed via the Session Manager and the Security Assertion Mark-up Language engine respectively.

22. The Authentication Provider of claim 21, wherein the Session Manager comprises means for retrieving from an Identity Manager, with Common Directory Service means, relationships between identities for the user under cellular Federation premises and those identities for the user under respective Service Provider premises, said identities correlated by a Single Sign-On main Identity.

23. The Authentication Provider in claim 18, wherein the Front End Authentication server inter-works with other entities in the cellular Federation acting as a Back End Authentication server for providing specific user data under mobile network operator premises.

24. The Authentication Provider in claim 23, wherein the Front End authentication server is an Authentication, Authorization and Accounting server, normally accessible from a Network Access Server in a cellular network.

* * * * *

UNITED STATES PATENT AND TRADEMARK OFFICE
CERTIFICATE OF CORRECTION

PATENT NO. : 7,221,935 B2  Page 1 of 1
APPLICATION NO. : 10/176471
DATED : May 22, 2007
INVENTOR(S) : Barriga-Caceres et al.

It is certified that error appears in the above-identified patent and that said Letters Patent is hereby corrected as shown below:

In Column 9, Line 22, delete "(MNOA)" and insert -- (MNO-A) --, therefor.

In Column 9, Line 26, delete "(UserXMNO-C)" and insert -- (User@MNO-C) --, therefor.

In Column 13, Line 11, delete "use@grealm" and insert -- user@realm --, therefor.

In Column 18, Line 28, delete "httms" and insert -- https --, therefor.

In Column 20, Line 67, in Claim 10, after "active" insert -- ; --.

Signed and Sealed this

First Day of April, 2008

JON W. DUDAS
*Director of the United States Patent and Trademark Office*